United States Patent [19]

Saarisalo et al.

[11] 4,387,880
[45] Jun. 14, 1983

[54] SINGLE-GRIP MIXING VALVE

[75] Inventors: Risto A. Saarisalo, Kuolimaa; Jorma T. Koppanen, Rauma, both of Finland

[73] Assignee: Oras OY, Rauma, Finland

[21] Appl. No.: 316,527

[22] Filed: Oct. 29, 1981

[30] Foreign Application Priority Data

Oct. 30, 1980 [FI] Finland ............................... 803407

[51] Int. Cl.³ ............................................. F16K 51/00
[52] U.S. Cl. ...................................... 251/285; 251/286
[58] Field of Search ................................ 251/285, 286

[56] References Cited

U.S. PATENT DOCUMENTS

| | | | |
|---|---|---|---|
| 845,540 | 2/1907 | Ferguson et al. | 251/286 |
| 1,104,918 | 7/1914 | Mouat | 251/285 |
| 1,746,055 | 2/1930 | Roberts et al. | 251/285 |
| 3,383,973 | 5/1968 | Gazal | 251/285 |
| 3,588,041 | 6/1971 | Johannisson | 252/285 |
| 3,964,514 | 6/1976 | Manoogian et al. | 251/285 |

Primary Examiner—Alan Cohan
Assistant Examiner—John A. Rivell
Attorney, Agent, or Firm—Oblon, Fisher, Spivak, McClelland & Maier

[57] ABSTRACT

The invention relates to a single-grip valve having a valve body with water inlets and a water discharge outlet and ceramic discs fitted in the body, the mutual position of the discs determining the mixing ratio of cold and hot water. One ceramic disc is moved by a lever which is attached with bearings to a turning piece fitted to turn inside the body. In order to limit the turning movement of this turning piece and, together with it, that of the lever, one of the members, the turning part and the body part surrounding it, is equipped with axial protrusions spaced around it and the other has respectively at least one axial protrusion. However, the protrusions of the different members do not overlap each other in the radial direction, but between the said members there is fitted at least one detachable limiting piece which can engage between the protrusions of one member and radially overlaps the protrusions of the other member.

4 Claims, 2 Drawing Figures

SINGLE-GRIP MIXING VALVE

BACKGROUND OF THE INVENTION

1. Field of the Invention

The present invention relates to a single-grip mixing valve, of the type having a valve body with water inlets and a water discharge outlet, ceramic discs fitted in the body, the mutual position of the discs determining the mixing ratio of cold and hot water, and a lever for moving one of the ceramic discs, the lever being attached with bearings to a turning piece fitted to turn inside the body, the said turning piece and the body part surrounding it being equipped with protrusions directed towards each other in order to limit the turning movement of the turning piece and, together with it, that of the lever.

2. Description of the Prior Art

An arrangement like this for limiting the movement of the lever of a mixing valve is known previously on the basis of, for example, German Utility Model No. 77,27,623. Therein the lever is attached with bearings to a sleeve which has inside toothing and fits over a hexagonal piece attached to the body. The sleeve can be positioned at different angles in order to alter the control range of the mixing ratio. The limitation of the movement of the lever is achieved by means of a notch in the sleeve, the lever extending through the notch and the sides of the notch serving as limiters for the lever. Thus the "width" of the control range is always the same and the range can be shifted only more towards "hot" or "cold".

German Lay-Open Print No. 1 258 688 also discloses a single-grip mixing valve of the type mentioned in the ingress, in which the control range is limited by inwards directed protrusions in the surrounding body and outwards directed protrusions in the turning part, one of the protrusions consisting of the head of a screw and the other one of a protrusion in a sleeve attachable in different positions by means of the screw. Thus, even in this arrangement, the control range can be extended or reduced as regards one of the extreme positions. The disadvantage is that the possibilities for varying the control range continue to be limited and, above all, that when the screw attachment slackens the sleeve can turn and the control range can change. A preselected, fixed, precise mixing position is not possible in this arrangement.

SUMMARY OF THE INVENTION

It is an object of the present invention to provide a structure which is improved in this regard but still equally simple and makes it possible to select the control range practically arbitrarily and also to fix the mixing ratio at that desired.

In order to achieve this, the invention provides a single-grip mixing valve of the character once described wherein the protrusions in the turning piece and in the surrounding body, respectively, are facing each other radially in a non-overlapping manner, and at least one detachable limiting piece being inserted between said parts and engaging the protrusions of one part while radially overlapping the protrusions of the other part in order to provide a selectable limit for the turning movement of the turning piece and, hence, of the lever.

The invention and its other characteristics and advantages will be described below in greater detail in the form of an example and with reference to the accompanying drawings.

DESCRIPTION OF THE PREFERRED EMBODIMENT

Figure 1:
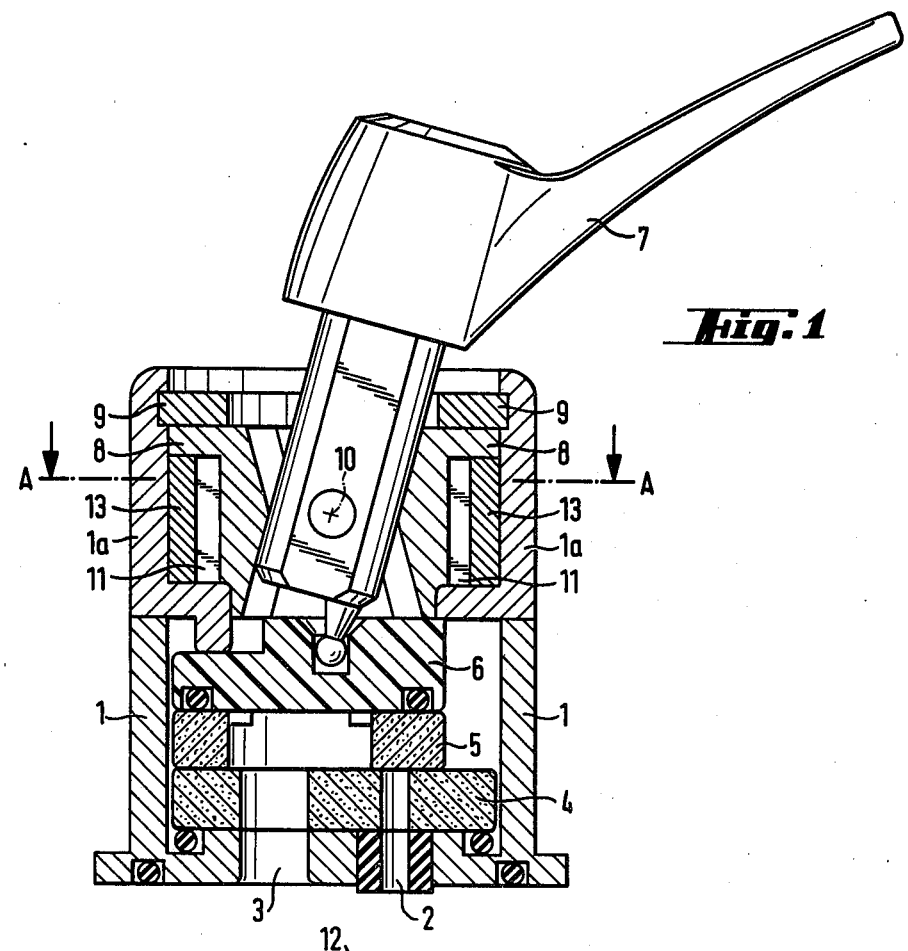
FIG. 1 depicts a side view of a valve according to the invention, partly as a section.

In the drawings, the body of the mixing valve is indicated by reference numeral 1. It includes an upper part 1A, which has been joined to the lower part of the body by, for example, ultrasonic welding. Furthermore, the body has two inlets 2 for cold and hot water, and one discharge outlet 3 for mixed water.

The mixing ratio of cold and hot water is adjusted by a method known per se by means of two ceramic discs 4 and 5, of which disc 4 is fixed to the body and disc 5 is movable.

A plastic piece 6 is fixed to disc 5, and together with the disc the piece 6 forms the water mixing chamber and is movable by means of a manual lever 7, which engages a slot in the upper surface of the piece 6.

Both the structure and operation of all the parts described above are well known to an expert in the art, and therefore they are not described in greater detail in this context. We can refer to, for example, Finnish Patent No. 58,823.

In the upper part 1a of the body there is fitted a sleeve-like piece 8, which can turn in the said upper part and to which lever 7 is further attached by means of a shaft 10. The piece 8 is held in place by a locking ring 9.

The turning movement of the lever around the shaft 10 is limited by the side walls of the central opening in the sleeve piece 8, the walls coming into contact with the lever arm.

Figure 2:
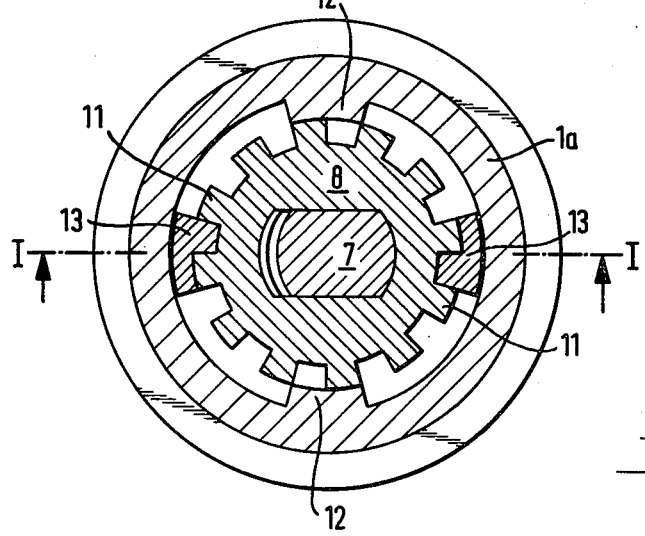
FIG. 2 depicts a section along line A—A in FIG. 1.

The turning movement of the lever, or the sleeve 8, in relation to the body is limited in accordance with the invention as follows. The external surface of the sleeve 8 is provided with axial teeth 11, which are best seen in the cross section in FIG. 2. The body part 1a has respectively two shoulders 12, which are situated diametrically opposite each other. The protrusions of the sleeve and the body part, in other words, the teeth 11 and the shoulders 12, do not, however, directly engage each other, but between the sleeve and the body there are fitted two axial pieces 13, which engage the teeth 11 and which, when the sleeve is turned, are stopped by the shoulders 12, thereby limiting the turning movement of the lever 7. The freely placeable limiting pieces 13 have an advantage in that the extreme positions of the lever can be selected arbitrarily in a very simple manner only by altering the position of the pieces 13. The width of a piece 13 in the case depicted in the figures is the same as the width of the shoulder 12, and this further corresponds to the pitch of the teeth 11, as shown in the figures. Thus the limiting pieces 13 can be placed, for example, on both sides of the shoulder 12, in which case a fixed mixing ratio can be obtained, when so desired. The essential idea is, however, as stated above, that an arbitrary selection of both extreme positions of the mixing range is possible.

By turning the limiting pieces 13, their contact surface can be caused to be aligned with either side of a tooth, in which case in the presented example the pitch of the arrangement is 15°.

The notches between the teeth 11 can widen somewhat inwards, so that the pieces 13 remain better in contact with them.

What is claimed is:

1. A single-grip mixing valve, which comprises a first part comprising a valve body;

inlets for hot and cold water and an outlet for mixed water in said body;

ceramic discs fitted inside the body and having openings therein cooperating with the inlets and outlet in the body and with each other in order to regulate the mixing ratio of cold and hot water;

a second part comprising a turning piece fitted for limited turning movement inside the body;

a lever attached with bearings to said turning piece and engaging one of said discs in order to move the same;

axial protrusions provided in the turning piece and in the surrounding body respectively, there being at least one protrusion in one of said parts and several protrusions in the other part, respectively, and the protrusions facing each other radially in a non-overlapping manner; and at least one detachable limiting piece being inserted between said parts and engaging the protrusions of one part while radially overlapping the protrusions of the other part in order to provide a selectable limit for the turning movement of the turning piece and, hence, of the lever.

2. A mixing valve according to claim 1, wherein the turning piece is sleeve-like and provided with axial teeth on its external surface, and wherein the surrounding body part has two diametrically opposite axial protrusions, there being fitted between these parts two axially extending limiting pieces which engage the teeth of the turning piece.

3. A mixing valve according to claim 2, wherein the toothing of the turning piece is symmetrical in such a manner that the width of a tooth is the same as the space between the teeth, and the total width of a limiting piece being the same as the added total width of a tooth and the adjacent space between teeth.

4. A mixing valve according to claim 3, wherein the width of the axial protrusion of the surrounding body part is the same as the width of the limiting piece.

* * * * *